United States Patent
Miller et al.

(10) Patent No.: US 6,574,951 B2
(45) Date of Patent: Jun. 10, 2003

(54) SOLAR THERMAL ROCKET

(76) Inventors: Barry Gene Miller, 313 Hunting La., Goode, VA (US) 24556; Richard Vail DeMars, 4201 Hilton Pl., Lynchburg, VA (US) 24503; Richard Lee Jetley, 1139 Shadow Ridge Dr., Forest, VA (US) 24551

( * ) Notice: Subject to any disclaimer, the term of this patent is extended or adjusted under 35 U.S.C. 154(b) by 0 days.

(21) Appl. No.: 10/158,045

(22) Filed: May 28, 2002

(65) Prior Publication Data

US 2002/0139107 A1 Oct. 3, 2002

Related U.S. Application Data

(63) Continuation of application No. 09/586,057, filed on Jun. 2, 2000, now Pat. No. 6,412,274.

(51) Int. Cl.[7] .................................................. H05B 1/00
(52) U.S. Cl. ........................................................ 60/203.1
(58) Field of Search ......................................... 60/203.1

(56) References Cited

U.S. PATENT DOCUMENTS 4,830,092 A  *  5/1989  Lee ............................. 165/10
5,459,996 A  * 10/1995  Malloy et al. .............. 60/200.1
6,065,284 A  *  5/2000  Horner et al. ............... 126/680
6,290,185 B1 *  9/2001  DeMars et al. .............. 244/172
6,311,476 B1 * 11/2001  Frye et al. .................. 60/203.1
6,343,464 B1 *  2/2002  Westerman et al. ........ 60/200.1

* cited by examiner

Primary Examiner—Charles G. Freay
(74) Attorney, Agent, or Firm—Robert C. Barsona

(57) ABSTRACT

A modular solar thermal rocket that receives and absorbs solar energy and then acts as a heat exchanger to provide propulsive thrust. Thermal energy storage modules receive and store solar energy via thermal energy storage elements provided in each module. The solar energy is focused into a cavity defined by the modules by a solar energy secondary concentrator. A preheater is positioned adjacent the solar energy secondary concentrator and is in fluid communication with a propellant supply and one end of the thermal energy storage modules. A propulsion nozzle is in fluid communication with the opposite end of the thermal energy storage modules. Stored propellant is directed through the preheater and the thermal energy storage modules where it is heated to a high temperature. The propellant is then directed to the propulsion nozzle where it is exhausted into space to provide propulsive thrust.

4 Claims, 5 Drawing Sheets

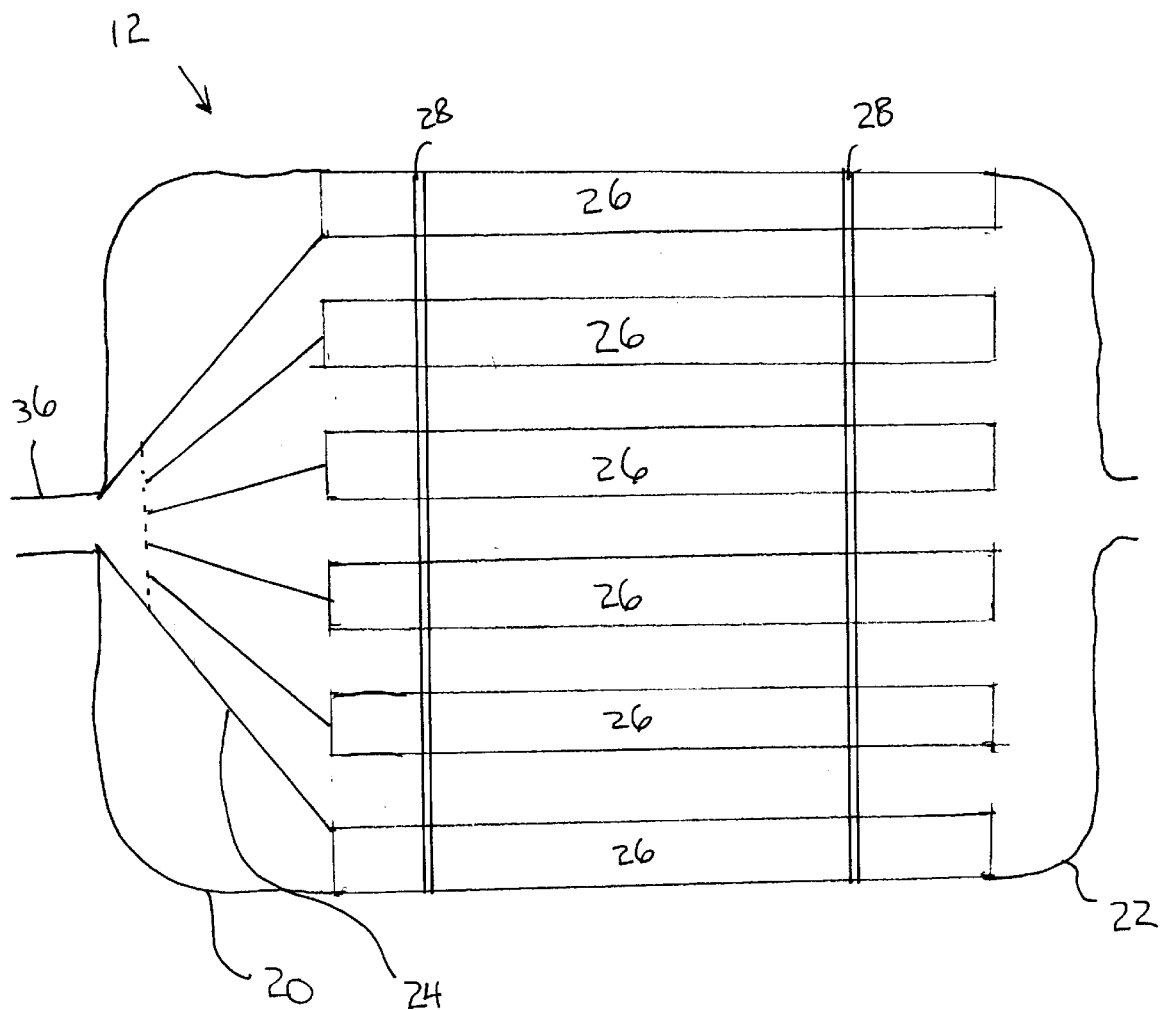

SOLAR THERMAL ROCKET

This is a continuation application of U.S. Ser. No. 09/586,057, filed on Jun. 2, 2000, now U.S. Pat. No. 6,412,274. The invention is generally related to solar thermal rockets and more particularly to the use of thermal energy storage modules in solar thermal rockets.

BACKGROUND OF THE INVENTION

1. Field of the Invention

The invention is generally related to solar thermal rockets and more particularly to the use of thermal energy storage modules in solar thermal rockets.

2. General Background

Solar thermal rockets were first proposed in 1954 as a way to provide greater specific impulse than chemical rockets. Solar thermal rockets use the sun's energy to heat a propellant (typically hydrogen) to extremely high temperatures and then expel the gas through a nozzle to produce thrust. The high temperature and low molecular weight of the propellant combine to produce a specific impulse of two to four times that of a chemical rocket. Generally, solar thermal rockets have been of a "direct gain" design, in which the propellant is heated directly by incident concentrated sunlight during a propulsive burn. Direct gain engines offer the capability to operate at very high temperatures (theoretically greater than 3000 K.) resulting in a very high specific impulse (theoretically greater than 950 seconds (ideal) for hydrogen). Material limitations typically limit the realized ideal specific impulse to less than 900 seconds. The disadvantage of direct gain systems is that they require very large, highly efficient primary solar concentrators (either alone or in combination with secondary concentrators) to provide the high power required to raise the propellant temperature to desired operating levels to yield thrust levels of interest. To date, these primary concentrators do not exist. In addition, direct gain systems must continually point their concentrators accurately toward the sun while thrusting. This places a premium on the overall system pointing and tracking requirements as well as the thrust vector control of the engine in order to ensure that the thrust is continuously in the direction required.

Stored thermal energy systems collect and store the incident solar energy over a relatively long period and then transfer the energy to the propellant during a short propulsive burn. The thermal energy storage design solves the primary concentrator problem by using existing smaller primary concentrators to collect and store solar energy over one or more orbital periods and then using the stored energy to heat the propellant over a short pulse burn. Several such heat-up and burn cycles (charge/discharge cycles) are performed to move the satellite to its destination. The longer the charge period of each cycle, the smaller the primary concentrator can be. This approach thus enables the use of existing primary concentrator technologies to develop an operational system, and permits higher thrust levels since thrust is decoupled from primary concentrator size. In addition, thrust operations can be performed without the need to maintain solar pointing during the propulsive maneuver, thereby simplifying the pointing and tracking hardware and software.

Stored thermal energy systems typically use either phase change material (which stores energy in the latent heat associated with changing from solid to liquid or liquid to gas) or solid, lightweight, high thermal capacity materials (which store the energy as sensible heat). Phase change systems typically operate at lower temperature while sensible heat systems can operate at very high temperatures. A number of drawbacks exist for these systems however. The major disadvantage in high temperature systems is that the energy storage materials (typically rhenium-encapsulated graphite or tungsten encapsulated boron nitride) have temperature limitations below direct gain systems. Dual material systems are needed since the high specific heat materials used as the thermal storage media tend to have high vapor pressures and react chemically with the hydrogen propellant. Coating of the storage media with high temperature metals or ceramics is required to provide long life. Material stability of these combined systems is challenged at the temperatures direct gain systems can operate. In order to offset this deficiency, a thermal energy storage design has to operate at higher thrust levels to achieve the same delivered impulse. Past designs have sought to apply the thin protective coatings directly to the storage material and rely on the storage material to serve as the structural member. In general, this has been very difficult to achieve on a consistent basis. Because the coating serves as a pressure boundary, it must be hermetically tight. If any region of the coating is found to leak, the whole surface must be coated further until any leakage is eliminated. Hence, manufacturing control and reliability are nearly impossible to achieve. Furthermore, failure of the coating or problems during the coating process can render the piece useless. An additional detriment is that since the storage material serves as the structural element, any change in size dictates a whole new design, fabrication, and design qualification process.

SUMMARY OF THE INVENTION

This invention addresses the above need. What is provided is a modular solar thermal rocket that receives and absorbs solar energy and then acts as a heat exchanger to provide propulsive thrust. This receiver/absorber/exchanger (RAX) is comprised of several thermal energy storage modules. The thermal energy storage modules (TEM) receive and store solar energy via thermal energy storage (TES) elements provided in each module. The solar energy from the primary concentrator is focused into a secondary concentrator which further focuses the sunlight into the cavity which is formed by the arrayed thermal energy storage modules. A preheater is positioned adjacent to the secondary concentrator and is in fluid communication with a propellant supply and a common header which feeds one end of each of the thermal energy storage modules. A propulsion nozzle is in fluid communication with the opposite end of the thermal energy storage modules. Stored propellant is directed through the preheater and the thermal energy storage modules where it is heated to a high temperature. The propellant is then directed to the propulsion nozzle where it is exhausted into space to provide propulsive thrust.

BRIEF DESCRIPTION OF THE DRAWINGS

For a further understanding of the nature and objects of the present invention reference should be made to the following description, taken in conjunction with the accompanying drawings in which like parts are given like reference numerals, and wherein:

FIG. 4A is a side view of thermal storage module of the present invention.

DETAILED DESCRIPTION OF THE PREFERRED EMBODIMENT

Figure 1:
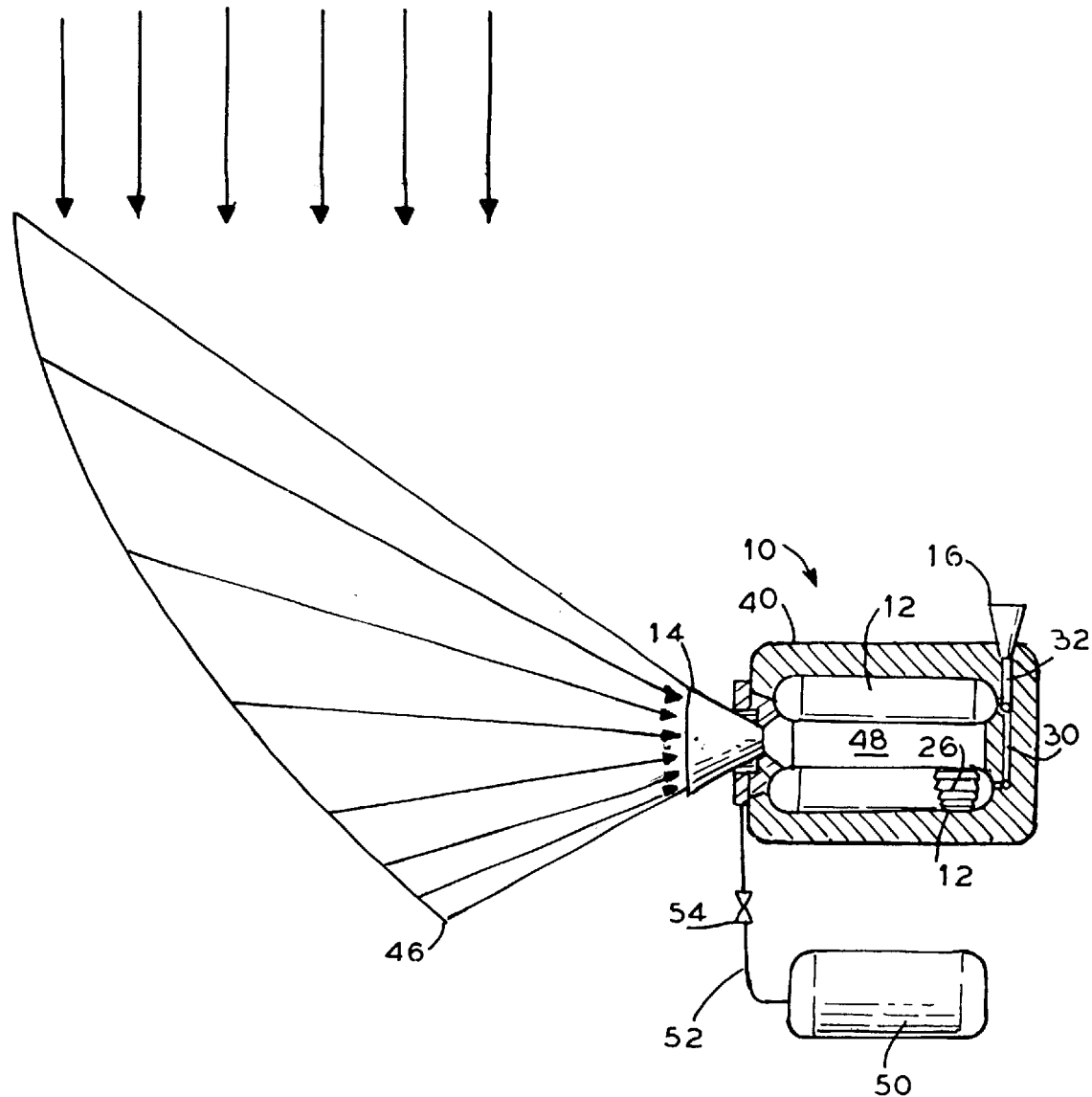
FIG. 1 schematically illustrates the invention.
Figure 2:
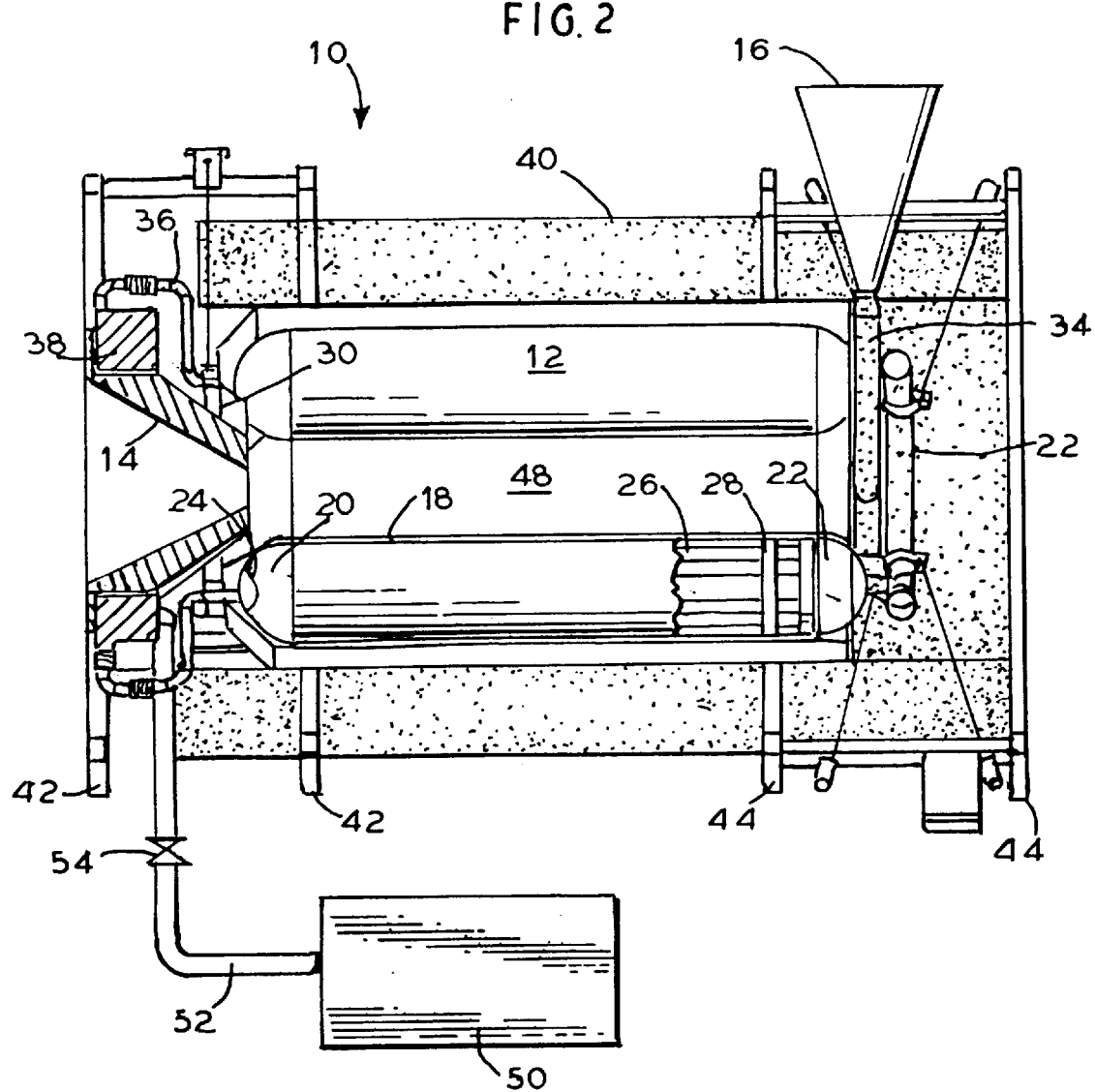
FIG. 2 is an enlarged detail view of the invention.

Referring to the drawings, it is seen in FIGS. 1 and 2 that the invention is generally indicated by the numeral 10. Solar thermal rocket 10 is generally comprised of one or more thermal energy storage modules 12, a secondary concentrator 14, and a propulsion nozzle 16.

Each thermal energy storage module 12 is formed from a pressure vessel 18, an inlet plenum head 20, an exit plenum head 22, a flow distributor 24, and nested thermal energy storage elements 26. The thermal energy storage elements 26 are concentric with each other. Each storage element 26 is formed form thermal storage material (typically graphite or boron nitride) coated with a protective metal or ceramic coating (typically rhenium, tungsten, or high temperature metal carbide). An internal support and locating structure 28 maintains the relative position of the storage elements 26.

Each thermal energy storage module 12 is joined to a common inlet plenum 30 and a common exit plenum 32. The exit plenum 32 is in turn connected via piping 34 to the propulsion nozzle 16. The common inlet plenum 30 is connected via piping 36 to a preheater 38.

The preheater 38 is mounted adjacent the secondary solar concentrator 14 to provide a source of heat for the preheater 38.

The thermal energy storage modules 12, common exit plenum 32, and piping 34 are surrounded by insulation 40.

First and second frameworks 42, 44 are provided at each end of the solar thermal rocket 10 to support the assembly within a satellite not shown.

In operation, focused sunlight from one or more primary solar concentrators 46, seen in FIG. 1, enters the secondary solar concentrator 14 where it is further concentrated before it enters the solar cavity 48 defined by the thermal energy storage modules 12. The concentrated solar energy is absorbed by the thermal energy storage elements 26, thus raising their temperature. Single phase or two-phase propellant from the propellant supply tank 50 is directed to the preheater 38 via piping 52 and control valve 54. The preheater 38 converts the propellant to single phase gas (if initially supplied as two-phase fluid) and/or heats the propellant to an intermediate temperature. The preheater 38 receives radiant energy from the secondary solar concentrator 14 as waste heat. The pre-heated gas is then evenly distributed to each of the thermal energy storage modules 12 via piping 36 and common inlet plenum 30. The divided gas enters the inlet head 20 where it impinges upon the flow distributor 24 which distributes the flow to each of the thermal energy storage elements 26 within the pressure vessel 18. The gas flows through concentric annuli formed by the nested thermal energy storage elements 26 where it is heated to very high temperatures and then is collected in the exit plenum head 22. From the exit plenum head 22 the gas is directed to the common exit plenum 32 and then to the propulsion nozzle 16 via interconnected piping 34. The heated propellant produces thrust as it is exhausted to space from the propulsion nozzle 16.

The invention provides several advantages.

The solar thermal rocket of the invention is capable of delivering significantly higher specific impulse (greater than 750 seconds on average) over chemical rocket systems (350–400 seconds) while still maintaining reasonably high thrust levels (up to 300 N in a dual engine/concentrator design). The receiver/absorber/exchanger relieves much of the manufacturing complexity for a flight sized propulsion system by basing the overall design on a few key components that can be readily assembled into a complete system. Because of its inherent design flexibility, identical modules can be built and subsequently assembled to attain required thrust levels that are tailored to mission requirements.

Depending on mission requirements and balance of plant design, the solar thermal rocket of the invention can be readily assembled using as many thermal energy storage modules as needed. The design of the thermal energy storage module also follows a modular approach. Several annular thermal storage elements are nested, one inside the other, to achieve the desired thermal mass required. The nested array of thermal energy storage elements are the loaded into the thermal energy storage module pressure vessel and secured in place. This design de-couples the pressure vessel from the graphite thermal energy storage elements. Thus, parallel processing of each thermal energy storage inner element and the outer rhenium pressure vessel becomes possible, thereby reducing costs and shortening system buildup times. The design also provides the opportunity to vary the thermal energy storage module geometry, predominantly in the axial direction but to a certain degree in the radial direction as well (the option of 2, 3, 4, or more concentric thermal energy storage cylinders is possible), without significant impact to the overall design. Finally, this approach provides for relaxed manufacturing specifications of the thermal energy storage elements. The chemical vapor deposition rhenium on the graphite does not need to be hermetically tight (as in a pressure boundary) and the geometry is a very simple one to machine and coat. This results in greater reliability.

High thrust levels, mission flexibility, and streamlined costs become possible with a modular approach. Stored energy propulsion systems are unique in that the delivered $I_{sp}$ (specific impulse) is near constant for extended periods. The high specific impulse at the associated thrust levels results in a design that yields higher performance than previous solar thermal designs and far exceeds the performance of current chemical systems while providing mission flexibility for satellite operators. The increased performance and responsiveness of the design also enables a number of satellite operations not currently achievable due to mass and propellant inefficiencies associated with current chemical rocket systems. The modular design allows parallel manufacturing of the respective components, thereby reducing the overall manufacturing time and cost. The operational flexibility coupled with the design and manufacturing flexibility result in an overall design concept that can meet the needs of an extremely diverse user community.

It should be understood that the configuration illustrated and described may be varied. The invention may be comprised of several thermal energy storage modules in either a one or two receiver/absorber/exchanger configuration. The thermal energy storage elements and coating materials may be comprised of materials not specifically mentioned such as ceramics in the carbide, nitride, or boride families. The annular thermal energy storage elements may instead be comprised of plates stacked in a number of varying ways that allow for passage of the propellant between individual or groups of plates in a manner similar to that described in the invention description. More than one secondary concentrator or no secondary concentrator may be employed in any given configuration. More than one propulsion nozzle may be incorporated into the assembly, as could a varied number of plenum designs and modes of manufacture.

Figure 3:
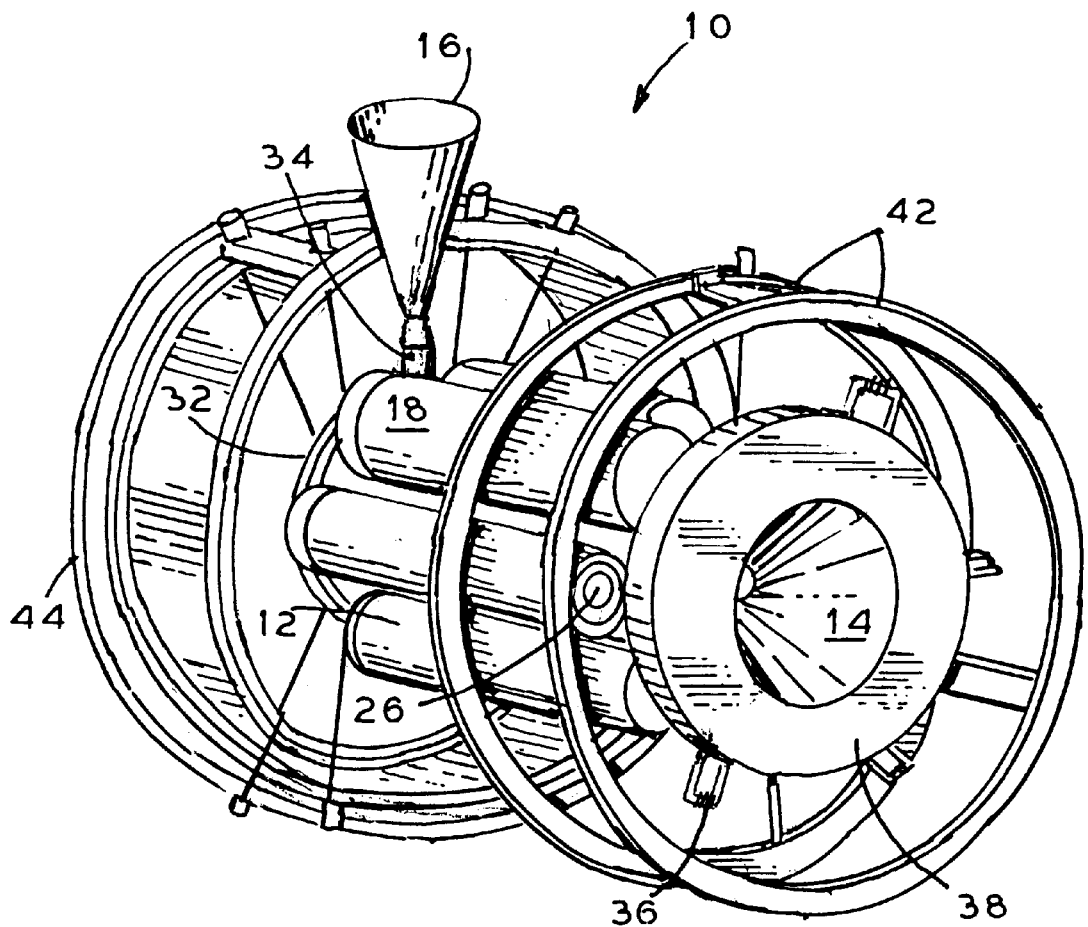
FIG. 3 is a perspective view of the invention with the insulation removed.
Figure 4B:
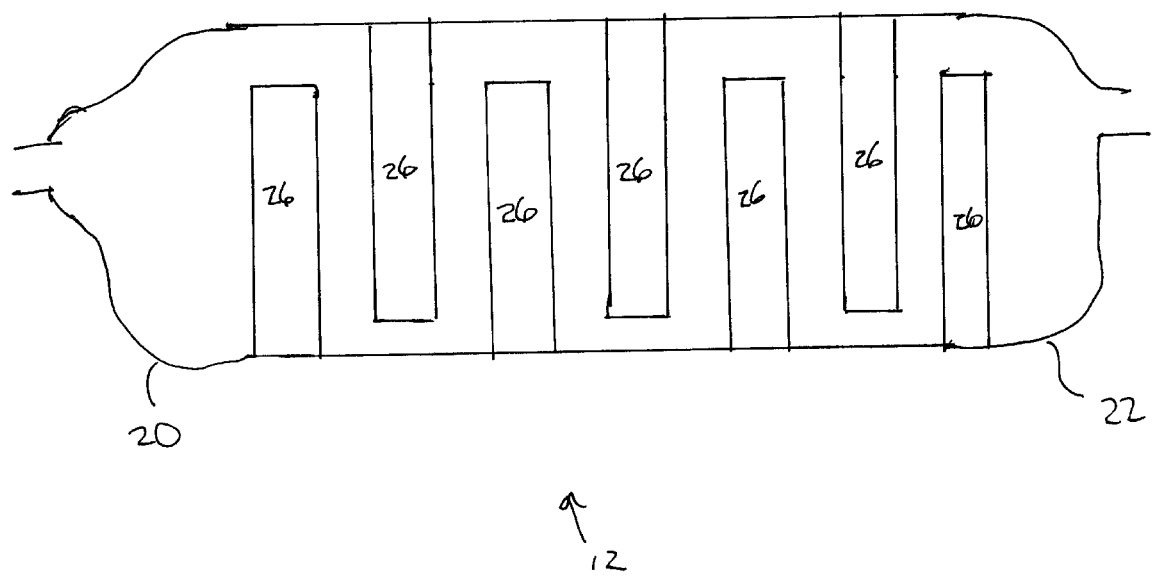
FIG. 4B is a side view of thermal storage module in an alternative embodiment of the present invention.

The precise configuration of nested concentric rings or plates is illustrated in FIGS. 4A and 4B. As seen in FIG. 4A, unheated or pre-heated propellant enters the thermal storage module 12 by way of inlet plenum head 20, which includes a flow distributor 24 in order to insure equal distribution of the propellant into the various heating channels (i.e., the spaces between thermal energy storage elements 26). Because FIG. 4A is a side view, it is understood that the individual storage elements 26 may be either elongated plates or actual concentric rings, both of which would be held in place within the pressure boundary by support and locating structures 28. In the event that the storage elements are formed as concentric rings, such rings may encapsulate one another (as suggested by element 26 in FIG. 3) or may encapsulate one or more flow channels within module 12 (i.e., the upper two elements form a single ring around the upper flow passage, the middle two elements form a single ring, etc.). In the event the storage elements 26 are flat plates, it is understood that these plates partially or completely extend across the width of the module 12 (i.e., the spatial plane perpendicular to the illustration). FIG. 4B depicts another configuration for storage elements 26 in the event that such elements take the shape of plates instead of concentric rings where, as above, the plates may partially or completely span the width of the module. Notably, other configurations for the storage elements 26, whether in ring or plate embodiments, and/or for the flow distributor 24 may be possible without departing from the principles of the invention.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A solar thermal rocket, comprising:
    a solar energy concentrator means for directing solar energy into a defined region;
    a plurality of pressure vessels positioned adjacent to the defined region with each vessel having:
        a plurality of thermal energy storage elements contained entirely within the vessel, wherein each thermal energy storage element is constructed from a thermal storage material with a protective coating and wherein the thermal energy storage elements in at least one pressure vessel are arranged in a concentric array;
        means for positioning the individual thermal energy storage elements to form passageways through which a propellant may flow;
        an inlet for receiving the propellant into the vessel;
        means for distributing the propellant inside of the vessel; and
        an outlet for expelling the propellant out of the vessel;
    a propellant storage container in fluid communication with the inlet of the at least one pressure vessel; and
    a propulsion nozzle in fluid communication with the outlet of the at least one pressure vessel.

2. The solar thermal rocket of claim 1, further comprising insulation positioned to substantially surround the defined region and wherein the insulation is also adjacent at least one of the pressure vessels.

3. A solar thermal rocket comprising:
    a solar energy concentrator means for directing solar energy into a defined region;
    a plurality of pressure vessels positioned adjacent to the defined region with each vessel having:
        a plurality of thermal energy storage elements contained entirely within the vessel, wherein each thermal energy storage element is constructed from a thermal storage material with a protective coating and wherein the thermal energy storage elements in at least one pressure vessel are arranged in a stacked plate array;
        means for positioning the individual thermal energy storage elements to form passageways through which a propellant may flow;
        an inlet for receiving the propellant into the vessel;
        means for distributing the propellant inside of the vessel; and
        an outlet for expelling the propellant out of the vessel;
    a propellant storage container in fluid communication with the inlet of the at least one pressure vessel; and
    a propulsion nozzle in fluid communication with the outlet of the at least one pressure vessel.

4. The solar thermal rocket of claim 3 further comprising insulation positioned to substantially surround the defined region and wherein the insulation is also adjacent at least one of the pressure vessels.

* * * * *